US012663009B2

(12) United States Patent
O'Sullivan et al.

(10) Patent No.: US 12,663,009 B2
(45) Date of Patent: Jun. 23, 2026

(54) MULTISTAGE PUMPING SYSTEM FOR ADAPTIVE OFFLOADING OF A LIQUID FROM A CONTAINER

(71) Applicant: Flowserve Pte. Ltd., Singapore (SG)

(72) Inventors: Mark O'Sullivan, Phillipsburg, NJ (US); Zachary Procita, Chalfont, PA (US); Ramakrishnan Rengasamy, Fogelsville, PA (US); Andreas Dreiss, Geestland (DE); William J. Boyko, Bath, PA (US)

(73) Assignee: Flowserve Pte. Ltd., Singapore (SG)

( * ) Notice: Subject to any disclaimer, the term of this patent is extended or adjusted under 35 U.S.C. 154(b) by 64 days.

(21) Appl. No.: 18/438,039

(22) Filed: Feb. 9, 2024

(65) Prior Publication Data

US 2025/0257731 A1    Aug. 14, 2025

(51) Int. Cl.
  *F04D 15/00*        (2006.01)
  *F04D 1/08*        (2006.01)
      (Continued)

(52) U.S. Cl.
  CPC ..... *F04D 15/0066* (2013.01); *F04D 25/0606* (2013.01); *H02K 1/17* (2013.01);
      (Continued)

(58) Field of Classification Search
  CPC ...... F04D 15/0066; F04D 13/06; F04D 13/14; F04D 7/02; F04D 29/66; F04D 1/06
  See application file for complete search history.

(56) References Cited

U.S. PATENT DOCUMENTS

| | | | |
|---|---|---|---|
| 1,632,357 A | 6/1927 | White | |
| 1,949,796 A | 3/1934 | Himmel | |
| | (Continued) | | |

FOREIGN PATENT DOCUMENTS

| | | | |
|---|---|---|---|
| EP | 2626573 A1 | 8/2013 | |
| JP | 2021169784 A | * 10/2021 | |
| | (Continued) | | |

OTHER PUBLICATIONS

Office action for U.S. Appl. No. 18/437,855, mail date Dec. 4, 2024, 28 pages.
(Continued)

*Primary Examiner* — Nathaniel E Wiehe
*Assistant Examiner* — Jackson N Gillenwaters
(74) *Attorney, Agent, or Firm* — Maine Cernota & Curran

(57) ABSTRACT

A pumping system includes a plurality of interconnected integrated motor/pump modules (IMPs) submerged in a process liquid, such as liquid hydrogen (LH2), within a container, the IMPs being separately controlled by adjustable speed drives (ASDs). The rotation speeds of the IMP impellers are controlled such that the NPSH_A for each IMP remains above a minimum, critical suction head NPSH_c of the IMP, while the outlet pressure and flow of the last IMP is maintained at a specified level unless its NPSH_A falls substantially to its NPSH_c, or until the container is substantially empty. The IMPs can be identical, initially operating at the same speeds, or the first IMP can be an inducer IMP having a reduced NPSH_c. The IMPs can comprise permanent magnets or induction coils attached to their impellers that pass in proximate radial or axial alignment with stator coils. The ASDs can be variable frequency drives (VFDs).

20 Claims, 9 Drawing Sheets

(51) Int. Cl.

| | | |
|---|---|---|
| *F04D 25/06* | (2006.01) | |
| *F04D 29/40* | (2006.01) | |
| *H02K 1/17* | (2006.01) | |

(52) U.S. Cl.

CPC ............ *F04D 1/08* (2013.01); *F04D 15/0094* (2013.01); *F04D 29/406* (2013.01); *F05D 2240/40* (2013.01); *F05D 2270/03* (2013.01)

(56) References Cited

U.S. PATENT DOCUMENTS

| | | | |
|---|---|---|---|
| 2,438,629 | A | 3/1948 | Anderson |
| 2,440,947 | A | 5/1948 | Hart |
| 2,752,857 | A | 7/1956 | White |
| 2,824,520 | A | 2/1958 | Bartels |
| 2,855,141 | A | 10/1958 | Van Rijn |
| 2,968,249 | A | 1/1961 | Caine |
| 3,102,679 | A | 9/1963 | Rudy |
| 3,135,212 | A | 6/1964 | Todd |
| 3,364,866 | A | 1/1968 | Sato |
| 3,868,196 | A | 2/1975 | Lown |
| 4,213,745 | A | 7/1980 | Roberts |
| 4,508,998 | A | 4/1985 | Hahn |
| 4,806,080 | A | 2/1989 | Mizobuchi |
| 5,117,141 | A | 5/1992 | Hawsey |
| 5,158,440 | A | 10/1992 | Cooper |
| 5,269,664 | A | 12/1993 | Buse |
| 5,332,374 | A | 7/1994 | Kricker |
| 5,494,418 | A | 2/1996 | Moriya |
| 5,567,133 | A | 10/1996 | Kobaybashi |
| 5,697,767 | A | 12/1997 | Bissell |
| 5,713,727 | A | 2/1998 | Veronesi et al. |
| 6,012,909 | A | 1/2000 | Sloteman |
| 6,034,465 | A | 3/2000 | Mckee |
| 6,056,518 | A | 5/2000 | Allen |
| 6,135,098 | A | 10/2000 | Allen |
| 6,175,173 | B1 | 1/2001 | Stephan |
| 6,422,838 | B1 | 7/2002 | Sloteman |
| 6,835,051 | B2 | 12/2004 | Heim |
| 7,067,950 | B2 | 6/2006 | Hirzel |
| 8,303,268 | B2 | 11/2012 | Werson |
| 11,323,003 | B2 | 5/2022 | Judge |
| 2002/0035974 | A1 | 3/2002 | Pawellek |
| 2002/0106290 | A1 | 8/2002 | Bader |
| 2003/0021683 | A1 | 1/2003 | Capone |
| 2004/0013547 | A1 | 1/2004 | Allen |
| 2005/0196269 | A1 | 9/2005 | Racer |
| 2007/0048158 | A1 | 3/2007 | Kochan, Jr. |
| 2008/0288115 | A1 | 11/2008 | Rusnak |
| 2009/0208349 | A1 | 8/2009 | Eller |
| 2011/0164995 | A1 | 7/2011 | Genster |
| 2011/0238172 | A1 | 9/2011 | Akdis |
| 2011/0318175 | A1 | 12/2011 | Converse |
| 2013/0028760 | A1 | 1/2013 | Lin |
| 2013/0213325 | A1 | 8/2013 | Kim |
| 2013/0236341 | A1 | 9/2013 | Anderson |
| 2015/0044026 | A1 | 2/2015 | Kilkenny |
| 2015/0104335 | A1 | 4/2015 | Faller |
| 2015/0143822 | A1 | 5/2015 | Chalmers |
| 2016/0006379 | A1 | 1/2016 | Wang et al. |
| 2016/0072362 | A1 | 3/2016 | Kube |
| 2016/0138596 | A1 | 5/2016 | Choudhuri |
| 2016/0305447 | A1 | 10/2016 | Dreiss et al. |
| 2019/0120249 | A1 | 4/2019 | Judge |
| 2019/0145428 | A1 | 5/2019 | Judge et al. |
| 2020/0067376 | A1 | 2/2020 | Judge |
| 2023/0081667 | A1 | 3/2023 | Alcad |

FOREIGN PATENT DOCUMENTS

| | | |
|---|---|---|
| JP | 2021173255 A | 11/2021 |
| JP | 2023116117 A | 8/2023 |
| WO | 9908366 A1 | 2/1999 |
| WO | 2010081123 A1 | 7/2010 |

OTHER PUBLICATIONS

PCT International Search Report & Written Opinion for Appl No. PCT/US2018/060690 dtd Mar. 12, 2019, 17 pages.

Office Action for U.S. Appl. No. 16/204,997 dated Jul. 2, 2020, 6 Pages.

Office Action for U.S. Appl. No. 16/668,665, dated Dec. 4, 2020, 6 Pages.

Office Action for U.S. Appl. No. 16/668,665, dated Jan. 15, 2021, 50 Pages.

International Search Report and Written Opinion for PCT Appl. No. PCT/US2020/056972, mail date Feb. 17, 2021, 11 Pages.

Office Action for U.S. Appl. No. 16/668,665, dated May 3, 2021, 27 Pages.

Advisory Action for U.S. Appl. No. 16/668,665 mail date Jul. 14, 2021, 5 pages.

Notice of Allowance for U.S. Appl. No. 16/668,665 mail date Feb. 22, 2022, 17 Pages.

International Preliminary Report on Patentability for PCT Appl. No. PCT/US2020/056972 Mail Date May 12, 2022, 8 pages.

Office Action for India Appl. No. 202217025766, dated Aug. 18, 2022, 7 Pages.

Extended European Search Report of EP Appl No. 20882691.7, mail date Nov. 11, 2022, 8 pages.

Office Action for JP application No. 2022-524573 mail date Jul. 18, 2023, 6 pages.

Notice of Allowance and Fees Due for U.S. Appl. No. 18/437,855 mail date Apr. 10, 2025, 8 Pages.

International Search Report and Written Opinion for PCT Appl. No. PCT/US2025/014905, mail date May 23, 2025, 10 Pages.

International Search Report and Written Opinion for PCT Appl. No. PCT/US2025/014845, mail date Jun. 4, 2025, 13 Pages.

* cited by examiner

Axial Flux Stator Coils

Product Lubricated Bearing 514

Stationary Rotor Stud (shaft) 208

Axial Flux Permanent Magnet

Impeller 506

MULTISTAGE PUMPING SYSTEM FOR ADAPTIVE OFFLOADING OF A LIQUID FROM A CONTAINER

RELATED APPLICATIONS

This application is related to U.S. Pat. No. 11,323,003, issued on May 3, 2022, which is herein incorporated by reference in its entirety for all purposes. This application is also related to U.S. patent application Ser. No. 18/437,855, filed concurrently with this application, which is herein incorporated by reference in its entirety for all purposes.

FIELD OF THE INVENTION

The invention relates to pumps, and more particularly, to submerged multi-stage centrifugal pumps that are configured to pump a liquid out from a container.

BACKGROUND OF THE INVENTION

Whenever it is necessary to quickly and completely "offload," i.e. empty, a liquid from a container that is not elevated, i.e. where the liquid cannot be gravitationally drained from the container, a pumping solution is required that will be efficient and reliable for all liquid levels in the container, and that can continue to pump the liquid until only a very low level of the liquid remains. The pumping of cryogenic and/or very low-density liquids can be especially challenging in this regard. In particular, liquid hydrogen can be very difficult to efficiently pump, because it is both cryogenic, and has an exceedingly low-density.

The collection, transport, and distribution of liquid hydrogen (LH2) is of increasing importance, due to the growing use of hydrogen as a fuel supply. In particular, "green" hydrogen is expected to play a critical role in reducing carbon emissions over the next few decades. The term "green" hydrogen refers to hydrogen that is produced using renewable clean energy sources, such as solar power and wind power.

Renewable energy generators, such as windmills and solar panels, can sometimes be installed proximate energy consumption locations, such as placing solar panels on the roof of a building or installing a windmill next to a factory. However, this approach is limited, due to siting constraints and economies of scale. Instead, it is often preferable to construct large green energy facilities in optimal locations, such as large solar panel arrays in deserts or windmill farms in coastal waters, and then to convey their power output to remote locations of energy consumption. In addition to taking advantage of favorable environments, and gaining economy of scale, this approach has the advantage of being able to utilize existing electrical power distribution networks to benefit larger numbers of energy consumers. However, it remains necessary to site such facilities near the electrical grids of consumers.

Instead, with reference to FIG. 1, green energy produced 102 at a remote location 100 that includes a source of water 104, can be used to generate hydrogen gas via hydrolysis 106. The hydrogen gas is compressed 108, and can be distributed to electrical generation plants wherever it is needed, in a manner similar to natural gas distribution. As with natural gas, it is often more efficient to liquefy 110 hydrogen gas before it is transported 116, thereby eliminating safety concerns associated with gas pressurization, and enabling an increased energy density to be enclosed within a given container space. Typically, the LH2 is stored 112, and then transferred 114 to ships, train cars, or trucks as needed. Finally, after the LH2 has been shipped 116 to an import location 118, it is transferred 120 and stored 122 in a storage container, from which it can be transferred to local energy generating plants, e.g. by trucks 124.

This approach to energy distribution requires that liquid hydrogen LH2 be pumped from the liquification apparatus 110 into a storage container 112, and then pumped from the storage container 114 to a container of a ship or other transport vehicle 116. The LH2 is then pumped from the transporting vehicle 116 to an import storage container 120, and finally it is pumped from local storage 122 to local distribution vehicles 124 such as trucks.

Efficient pumping of LH2 into and out of multiple containers is therefore a critical requirement of this approach of using LH2 to distribute energy from production sites to consumers. If each of the containers cannot be emptied quickly and completely, there will be significant losses of LH2 due to boil-off of the LH2 volumes that remain in each of the containers.

For the emptying of most conventional liquids from containers, it is typical to employ a centrifugal pump that is submerged in the process liquid within the tank. One approach is to implement a vertical turbine pump (VTP), which is a vertical centrifugal pump having a plurality of pumping stages submerged in the process liquid and connected by a single impeller shaft to a motor that is located above the tank. However, for some applications this approach is not desirable, due to potential leakage of lubricants and/or process liquid past the seals that must be applied to the impeller shaft. Also, this approach can require significant maintenance and high operating costs. These problems can be exacerbated when pumping cryogenic liquids, where reliable seals can be difficult and expensive to implement, and where the impeller shaft can provide a significant channel through which heat can flow from the environment into the process liquid, thereby increasing boiloff of the liquid.

Another approach is to use a "seal-less" submersible pump that includes a submerged electrical motor, shaft, and impellers, all contained within a common housing, so that rotating shaft seals are not required. The most common configuration for seal-less submersible pumps is to arrange the impeller shaft vertically and locate the electrical motor below the impellers, so that the motor does not interfere with the vertically upward flow of the process liquid. However, this configuration is not desirable if it is necessary to fully offload the process liquid from the container, because this configuration will be unable to reduce the liquid level below the top of the motor. Instead, bottom intake pumps can be used, for which the liquid is routed around the motor, for example through a shroud. While other configurations are possible, typically the pumping stages are arranged vertically, and the motor is installed above the pumping stages. However, bottom intake pumps tend to have large, heavy, and complex designs, and also tend to have high costs, as well as other significant technical disadvantages.

Furthermore, multi-stage pumps of any design tend to be of low efficiency when fully offloading a liquid from a container. This is because, for any given operating rate, it will be necessary to maintain the available net positive suction head NPSH_A of the first pumping stage above a "critical" net positive suction head (NPSH_c). In general, the critical net positive suction head NPSH_c will vary with the rotation speed of the impellers, and will depend upon several factors, according to the specific application of the pumping system.

One consideration in determining NPSH_c is the NPSH_R (net positive suction head required), which is a value of the net positive suction head at which a defined drop in total dynamic head (TDH) will occur at a given flow condition. Typically, this is defined to be a 3% head drop NPSH_3%. Often, cavitation will begin at values of NPSH_A that are much higher than the NPSH_R. The NPSH_A at which cavitation first begins is sometimes referred to as the "incipient" cavitation net positive suction head, or NPSH_i, which is the NPSH at which visible bubbles of gas begin to appear. NPSH_i can be more than three to five times higher than NPSH_3%. In some embodiments, NPSH_c is defined to be the value of NPSH_A at which the NPSH margin ratio NPSH_A/NPSH_R reaches a certain critical value. The value of NPSH_c can also be affected by the effects of low NPSH_A on impeller life.

Accordingly, as the level of process liquid in the tank is reduced, and the pressure of the process liquid falls at the inlet of the pump, it will be necessary to reduce the rotation rate of the impeller shaft so that the NPSH_c is reduced, and remains below the NPSH_A of the first pumping stage. As a result, pumping efficiency will suffer, and it may not be possible to maintain a desired pressure and flow at the outlet of the pump. One approach is to include a separate, so called "stripping pump," in parallel with the primary pump, where the stripping pump is configured to pump out residual liquid from the container at lower flow rates and lower NPSH_c. However, installing an additional, separate stripping pump is costly, and further reduces the liquid volume that is available in the container.

Pumping very low-density liquids can be especially challenging for centrifugal pumps, in that a low process liquid density significantly reduces the differential pressures generated by traditional centrifugal pump designs, because the differential pressure that is generated by a centrifugal pump is proportional to the product of the pumped liquid density and the head generated by the pump. For example, pumping liquid hydrogen can be highly challenging, due to the much lower density of LH2 as compared to LNG, liquid nitrogen (LN) and other liquified gasses. Accordingly, it can be necessary to significantly increase the rotation speed of a centrifugal pump to achieve a desired pressure difference when pumping a very low-density liquid, such as LH2. However, increasing the rotation speed necessarily increases NPSH_c for the pumping stages. Accordingly, the pump cannot continue to operate at a high speed once the liquid falls below a certain level within the container, causing the NPSH_A of the first pumping stage to fall below the NPSH_c of the first pumping stage.

Another approach is to implement a positive displacement pump instead of a centrifugal pump. However, positive displacement pumps, such as piston pumps, are difficult to implement at larger sizes and flow volumes. Positive displacement pumps also tend to generate larger vibrations than centrifugal pumps, and can require significantly more monitoring and preventative maintenance to avoid failure and unplanned shut-down of the pump. Also, positive displacement pumps typically require a separate lubricant, rendering them difficult or impossible to employ when pumping a cryogenic low-density liquid, such as liquid hydrogen. Furthermore, it is not possible to include a lubricant when pumping liquid hydrogen that will be used in fuel cells, due to the extreme sensitivity of fuel cells to impurities. As a result, and because LH2 is a poor lubricant, positive displacement pumps tend to seize or otherwise fail when pumping LH2.

What is needed, therefore, is a pumping system for offloading a process liquid from a container that can maintain optimal pumping efficiency and provide a desired output head and flow during substantially the entire offloading process.

SUMMARY OF THE INVENTION

The present invention is a pumping system for offloading a process liquid from a container that can maintain optimal pumping efficiency and provide a desired output head and flow during substantially the entire offloading process.

The pumping system of the present invention is a multi-stage, submersible, centrifugal pumping system that provides a significantly faster offloading of a process liquid from a container, especially for very low-density liquids such as LH2, as compared to conventional pumps.

The disclosed pumping system includes a plurality of bottom intake pumping modules that are arranged and interconnected in series within the container. In embodiments, the pumping modules are arranged vertically, and in some embodiments the pumping modules directly interconnect with each other without intervening pipes or hoses. Each of the pumping modules is an "integral motor pump" (IMP), in that the single impeller in each module is driven by a motor that is also included in the module, each of the motors being independently variable in speed under control of a controller. By separately controlling the speeds of the pumping modules as the level of liquid in the container falls, the pumping system is able to adapt to the falling NPSH_A at the first stage, thereby maintaining optimal pumping efficiency and providing a desired output pressure and flow during most of the offloading process, and in embodiments during the entire offloading process.

In embodiments, at the beginning of an offloading cycle when the level of the process liquid within the container is high, the desired output head of the pumping system is divided by the controller among the pumping modules, such that each of the pumping modules operates at a high rate. In some embodiments where all of the pumping modules are substantially identical, the controller causes all of the motors to operate initially at the same rate, so that each of the pumping modules contributes equally to the final outlet pressure. In other embodiments, the first pumping module is an inducer module having an NPSH_c that is lower than the NPSH_c's of the other pumping modules as a function of impeller rotation speed, and is thereby able to continue functioning at very low values of NPSH_A.

According to the present invention, as the process liquid falls to a level within the container that causes the NPSH_A of the first (lowest) pumping module to approach its NPSH_c, the controller causes that module to reduce its rotation rate, thereby reducing its NPSH_c, while concurrently causing the remainder of the pumping modules to compensate by increasing their rotation rates. This process continues unless and until the NPSH_A at the second pumping module falls to its NPSH_R, at which point its operating rate is also reduced, while the rotation rates of the remaining stages are increased in compensation.

According to this approach, the desired output pressure and flow of the pumping system is maintained until the container is empty, or until the NPSH_A at the inlet of the topmost pumping module approaches its NPSH_c, at which point its operating rate is reduced, and the output flow and pressure of the entire pumping system begins to fall. As a result, the desired output head and flow are maintained to a much lower liquid level, as compared to conventional pumps in which all of the impellers are constrained to rotate at the same rate. Furthermore, by providing a sufficient number of pumping modules, some embodiments are able to maintain a desired output pressure and flow throughout the offloading phase, until the final "stripping" stage is reached in which the intake of the first module is no longer sufficiently covered by liquid to avoid significant gas entrainment.

The disclosed pumping system thereby provides significantly faster offloading of a process liquid from a container, especially for very low density liquids such as LH2, as compared to conventional pumps in which all of the impellers operate at the same rate, because separately varying the rotation speeds of the pumping modules enables higher flow rates to be maintained at lower liquid levels within the container.

One general aspect of the present invention is a pumping system configured for pumping a process liquid to an external destination from a container until the container is substantially empty. The pumping system includes a controller and a plurality of centrifugal integrated pumping modules (IMPs) configured for being submerged in the process fluid. Each of the IMPs includes an inlet, an outlet, an impeller, a shaft, and a motor.

For each of the IMPs, a corresponding adjustable speed drive (ASD) is controlled by the controller and configured to cause the motor of the IMP to rotate the impeller of the IMP at a rotation speed that is specified by the controller, the impeller rotation speeds of the IMPs being thereby separately controllable by the controller.

For each of the IMPs except a last of the IMPs, the outlet of the IMP is in fluid communication with the inlet of a next one of the IMPs. The input of a first of the IMPs is submerged in the process liquid, and the output of the last of the IMPS is in fluid communication with the external destination.

As a level of the process liquid within the container falls, the controller is configured to adjust the rotation speeds of the impellers of each of the IMPs such that for each of the IMPs, a critical net positive suction head NPSH_c of the IMP remains below an available net positive suction head NPSH_A of the IMP, while an outlet pressure at an outlet of the last IMP is maintained at a specified level until the NPSH_A of the last IMP falls substantially to the NPSH_c of the last IMP, or until the container is substantially empty of the process liquid.

In embodiments, all of the IMPs are substantially identical to each other. In some of these embodiments, the controller is configured to cause all of the impellers of the IMPs to rotate at the same speed, except for any of the IMPs that requires a reduction of its impeller speed to ensure that its NPSH_c remains below its NPSH_A. In other embodiments, the first IMP is an inducer IMP having an NPSH_c that is lower than the NPSH_c's of the other IMPs as a function of impeller rotation speed.

In any of the above embodiments, the IMPs can be arranged vertically, the first IMP being a lowest IMP and the last IMP being an uppermost IMP.

In any of the above embodiments, the inlet of each of the IMPs except the lowest of the IMPs can be inserted into the outlet of a next lowest of the IMPs, or the outlet of each of the IMPs except the uppermost of the IMPs can be inserted into the inlet of a next highest of the IMPs.

In any of the above embodiments, at least one of the ASDs can be a variable frequency drive (VFD).

In any of the above embodiments, the pumping system can include a sufficient number of the IMPs to ensure that the NPSH_A of the last IMP does not fall substantially to the NPSH_c of the last IMP before the container is substantially empty of the process liquid.

In any of the above embodiments, the process liquid can be liquid hydrogen (LH2).

In any of the above embodiments, the motor of at least one of the IMPs can include a stator comprising a plurality of stator coils, and a plurality of induction coils or permanent magnets fixed to the impeller and configured to pass in proximate alignment with the stator coils when the impeller rotates, rotational torque being thereby imparted directly from the stator coils to the impeller.

In any of the above embodiments, for at least one of the IMPs the plurality of permanent magnets or induction coils can be configured to pass in proximate radial alignment with the stator coils when the impeller rotates.

In any of the above embodiments, the plurality of induction coils or permanent magnets can be configured to pass in proximate axial alignment with the stator coils when the impeller rotates.

And in any of the above embodiments, at least one of the IMPs can be configured to cause the process liquid to flow through an annual passage formed between a module housing and a housing of the stator.

A second general aspect of the present invention is a method of pumping a process liquid from a container until the container is substantially empty. The method includes providing a pumping system comprising a controller and a plurality of centrifugal integrated pumping modules (IMPs) configured for being submerged in the process fluid. Each of the IMPs includes an inlet, an outlet, an impeller, a shaft, and a motor. For each of the IMPs, the pumping system includes a corresponding adjustable speed drive (ASD) controlled by the controller and configured to cause the motor of the IMP to rotate the impeller of the IMP at a rotation speed that is specified by the controller, the impeller rotation speeds of the IMPs being thereby separately controllable by the controller.

The method further includes, for each of the IMPs except a last of the IMPs, causing the outlet of the IMP to be in fluid communication with the inlet of a next one of the IMPs, submerging the input of a first of the IMPs in the process liquid, and causing the output of the last of the IMPS to be in fluid communication with the external destination. The method then includes causing the impellers of the IMPs to rotate under control of the ASDs according to instructions issued to the ASDs by the controller, thereby causing a level of the process liquid within the container to fall as the process liquid is transferred to the external destination.

As the level of the process liquid within the container falls, the method includes adjusting the rotation speeds of the impellers of each of the IMPs, under control of the ASDs according to instructions issued to the ASDs by the controller, such that for each of the IMPs, a critical net positive suction head NPSH_c of the IMP remains below an available net positive suction head NPSH_A of the IMP, while an outlet pressure at an outlet of the last IMP is maintained at a specified level until the NPSH_A of the last IMP falls substantially to the NPSH_c of the last IMP, or until the container is substantially empty of the process liquid.

In embodiments, the process liquid is liquid hydrogen (LH2).

In any of the above embodiments, all of the IMPs can be substantially identical to each other. In some of these embodiments, causing the impellers of the IMPs to rotate includes causing all of the impellers of the IMPs to rotate at the same speed, except for any of the IMPs that requires an impeller speed reduction to ensure that its NPSH_c remains below its NPSH_A.

In any of the above embodiments, the motor of at least one of the IMPs can include a stator comprising a plurality of stator coils, and a plurality of induction coils or permanent magnets fixed to the impeller and configured to pass in proximate alignment with the stator coils when the impeller rotates, rotational torque being thereby imparted directly from the stator coils to the impeller.

In any of the above embodiments, for at least one of the IMPs the plurality of induction coils or permanent magnets can be configured to pass in proximate radial alignment with the stator coils when the impeller rotates.

In any of the above embodiments, the plurality of induction coils or permanent magnets are configured to pass in proximate axial alignment with the stator coils when the impeller rotates.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a pumping system for offloading a process liquid from a container that can maintain optimal pumping efficiency and provide a desired output head and flow during substantially the entire offloading process.

Figure 1:
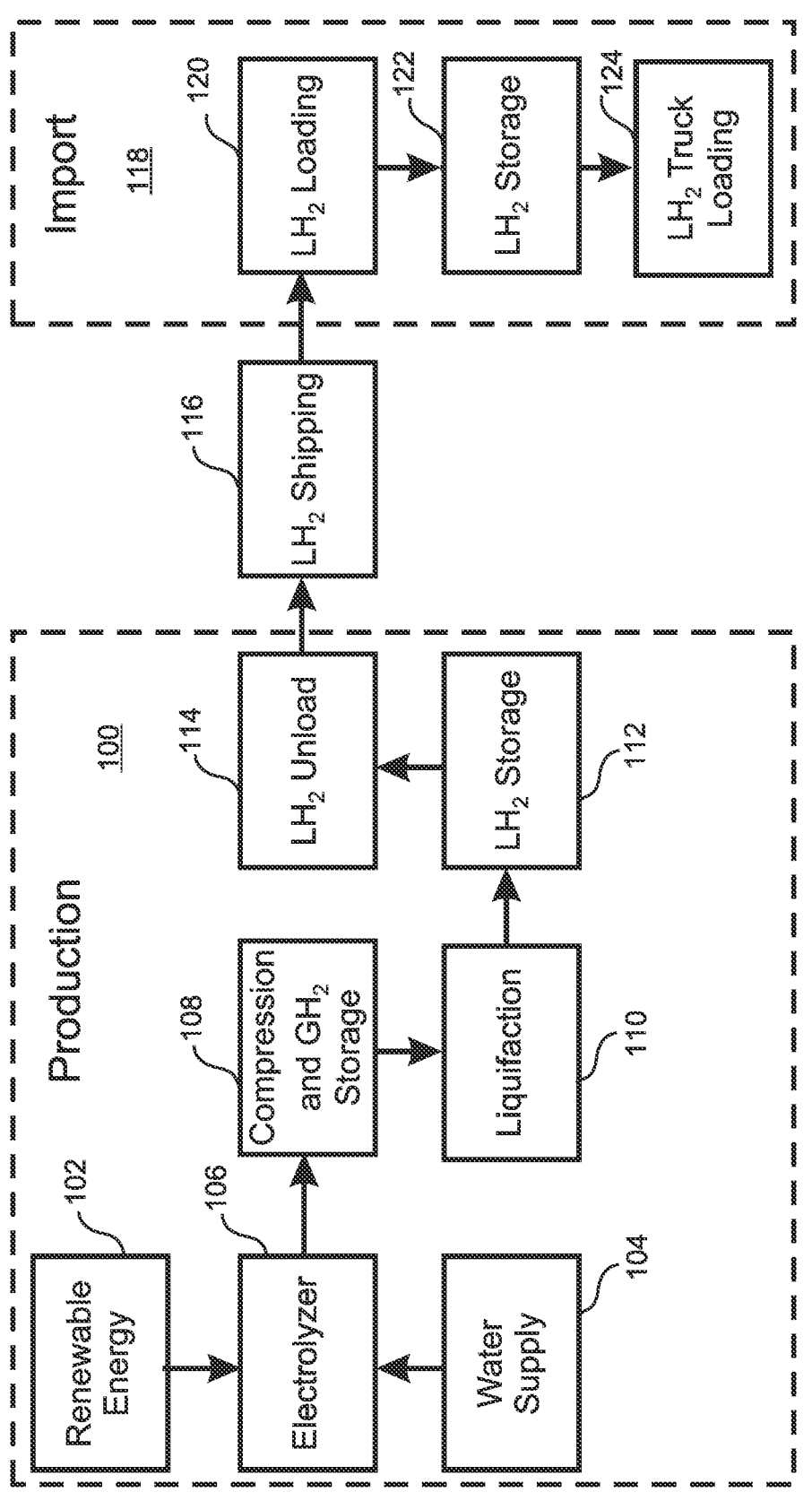
FIG. 1 is a flow diagram illustrating the use of liquid hydrogen in the prior art as a medium for distributing energy from a green energy production site to an energy consumption location.
Figure 2:
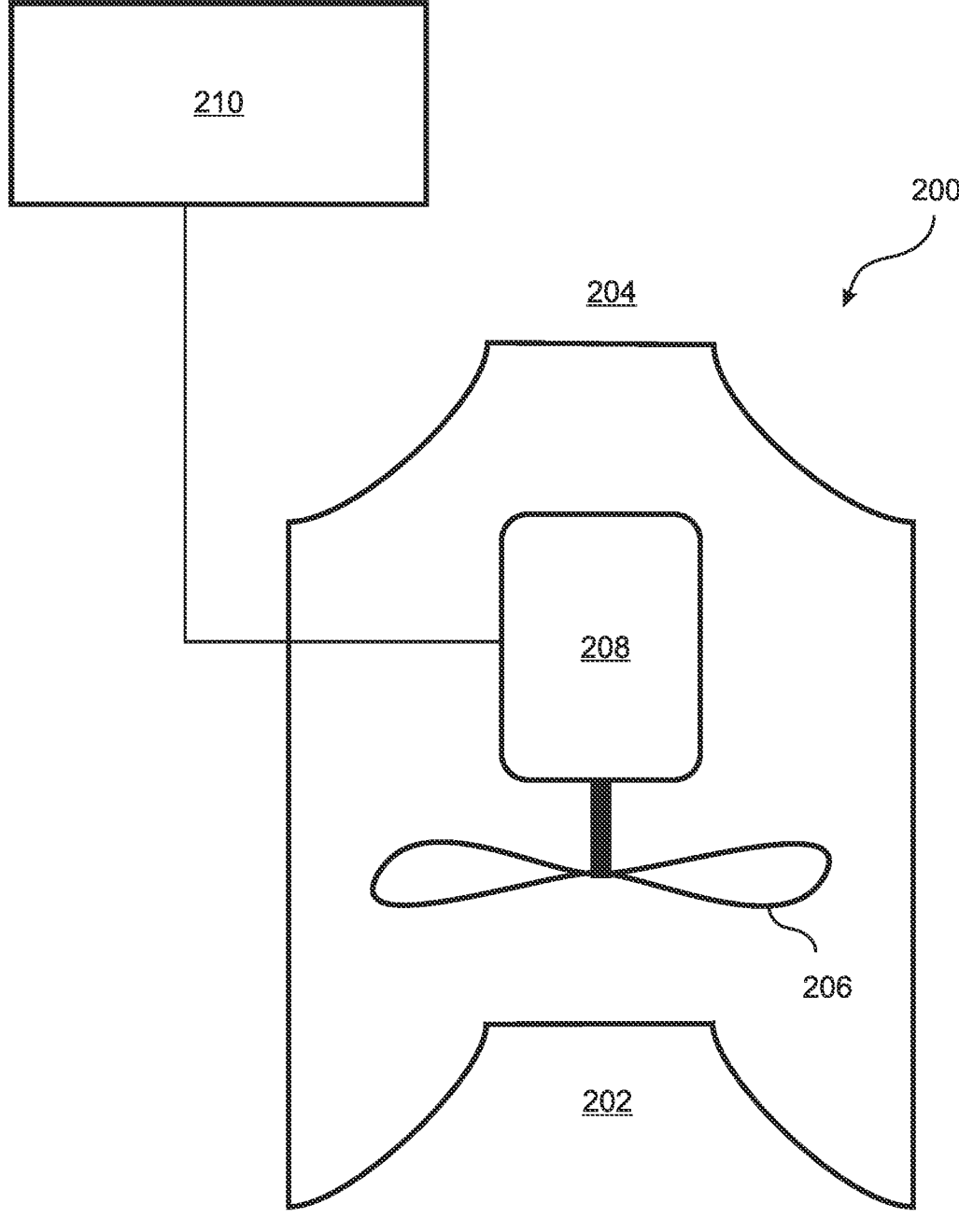
FIG. 2 is a block diagram of an IMP module in an embodiment of the present invention.
Figure 3:
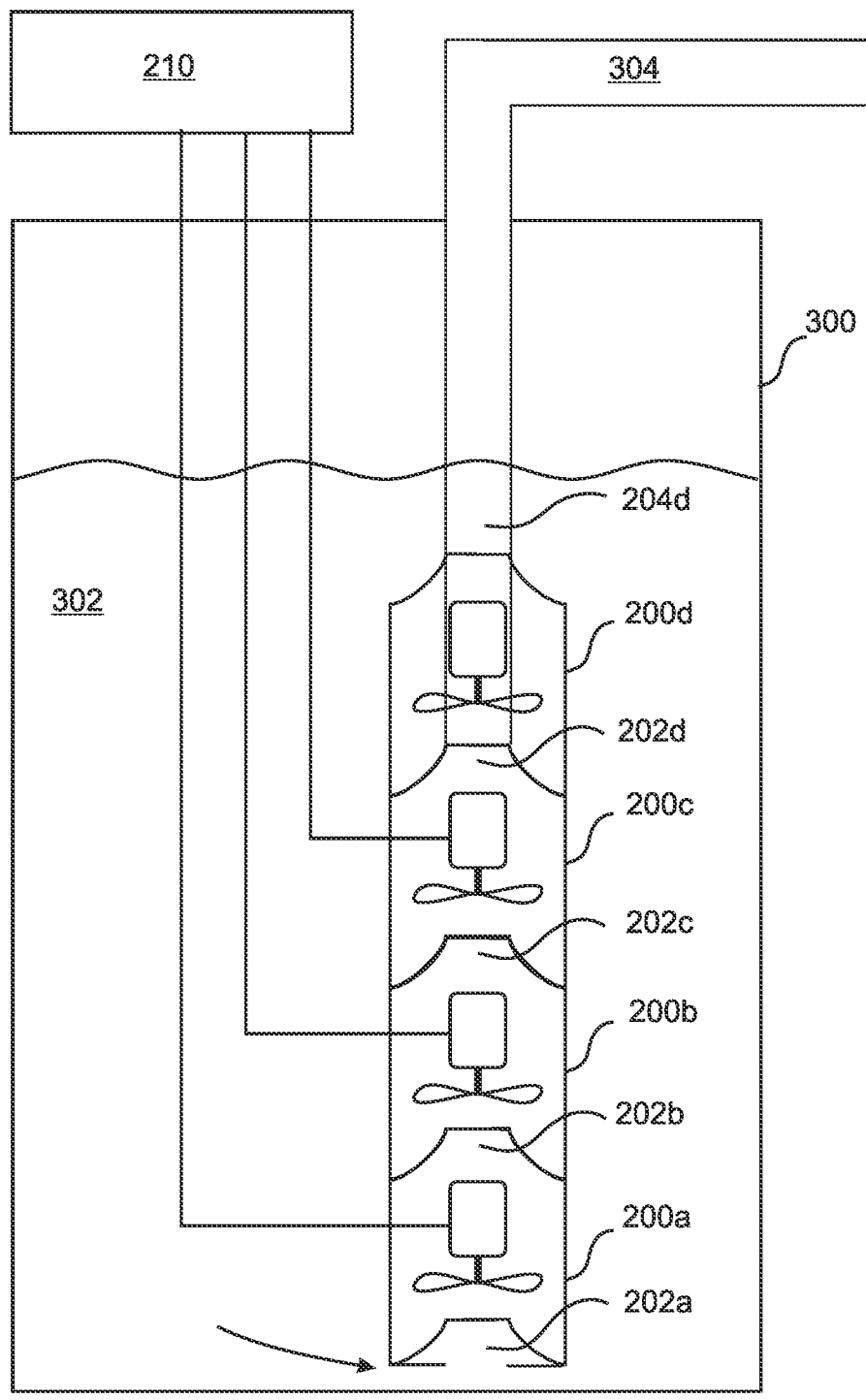
FIG. 3 is a block diagram illustrating an embodiment of the present invention that includes four IMP modules.

With reference to FIGS. 2 and 3, the disclosed pumping system includes a plurality of bottom intake pumping modules 200. In the embodiment of FIGS. 2 and 3, the pumping modules 200 are vertically arranged 200a-200d and interconnected in series within the container 300 without intervening pipes or hoses. Each of the pumping modules 200a-200d is an "integral motor pump" (IMP), in that the impeller 206 in each module is driven by a motor 208 that is also included in the pumping module 200, each of the motors 208 being independently variable in speed under control of a variable speed controller 210.

By separately controlling the speeds of the motors 208 in the pumping modules 200a-200d as the level of liquid 302 in the container 300 falls, the pumping system is able to adapt as the inlet pressure at the inlet 202a of the first stage 200a is reduced, thereby maintaining optimal pumping efficiency and providing a desired output pressure and flow at the outlet 204d of the last stage 200d during most of the offloading process, and in embodiments during the entire offloading process.

Figure 4A:
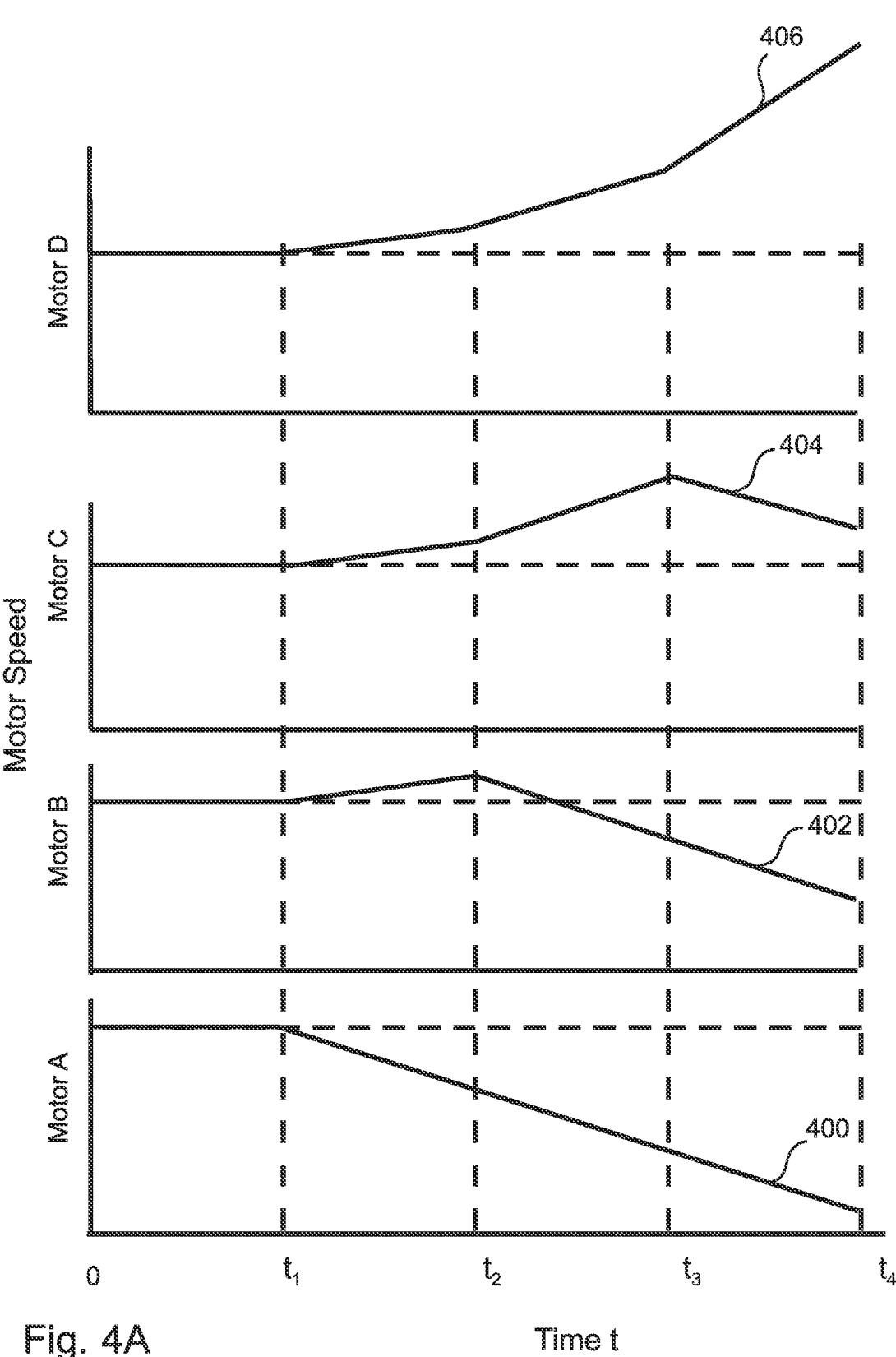
FIG. 4A is a set of graphs illustrating motor speeds of the IMP modules of FIG. 3 versus time as the liquid level falls in a container according to an embodiment of the present invention.
Figure 4B:
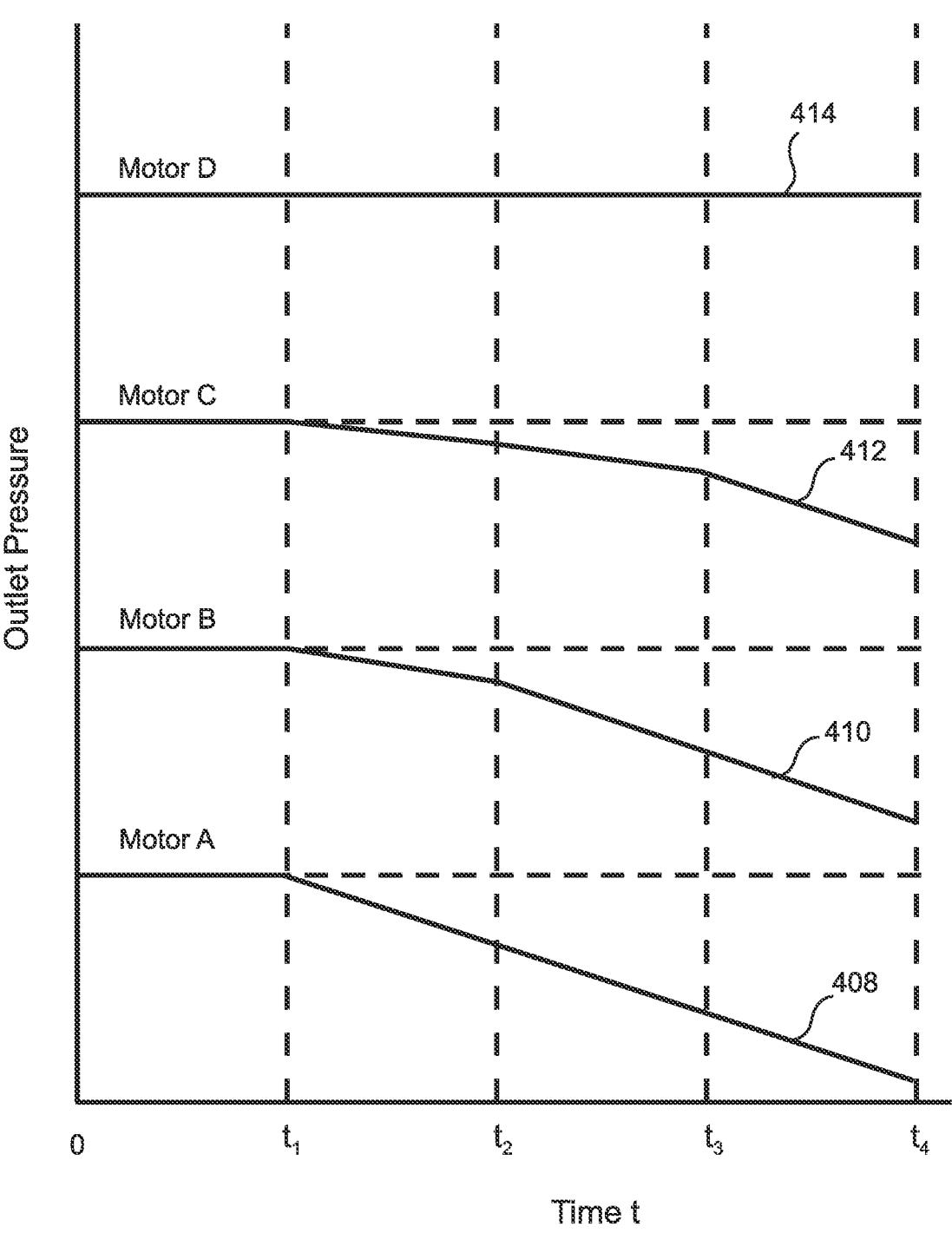
FIG. 4B is a set of graphs illustrating outlet pressures of the IMP modules of FIG. 3 versus time as the liquid level falls in a container according to an embodiment of the present invention.

In embodiments, with reference to FIGS. 4A and 4B, at the beginning of an offloading cycle, indicated as the time interval between t=0 and t=t₁, when the level of the process liquid within the container is high, the desired output pressure 414 of the pumping system is divided by the controller 210 among the pumping modules 200a-200d, such that each of the pumping modules 200a-200d operates at a high rotation rate. In the embodiment of FIGS. 4A and 4B, all of the pumping modules 200a-200d are substantially identical, such that the controller 210 causes all of the motors 208 to operate initially at the same rate 400, 402, 404, 406, so that each of the pumping modules 200a-200d contributes equally to the pressure at the outlet 304.

In other embodiments, the first pumping module 200a is an inducer module having an NPSH_c that is lower than the NPSH_c's of the other pumping modulus 200b-200d as a function of impeller rotation speed, and is thereby able to continue functioning at very low values of NPSH_A.

As the liquid 302 is pumped out of the container 300, the level of the process liquid 302 within the container 300 is reduced until, at time t₁, the NPSH_A at the inlet 202a of the first (lowest) pumping module 200a approaches its NPSH_c. To avoid NPSH_A falling below NPSH_c in the first module 200a, the controller 210 begins at time t₁ to reduce the rotation speed 400 of the first module 200a, thereby reducing its outlet pressure 408, and continues to do so throughout the remainder of the pumping process, so that the NPSH_c of the first module 200a remains below NPSH_A at the inlet 202a of the first module 200a as the level of the liquid 302 in the container 300 continues to fall. Concurrently, the controller 210 causes the remaining modules 200b-200d to compensate by increasing their operating rates 402, 404, 406, and thereby increasing the pressures 410, 412, at the outlets 202b, 202c of stages 200b-200c, so that the pressure 414 at the outlet 304 of the final stage 200d remains at its desired level.

This process continues until, at time t₂, the NPSH_A at the inlet 202b of the second pumping module 200b falls to its NPSH_c, at which point the controller 210 begins to reduce the operating rate 402 of the second pumping module 200b, thereby reducing NPSH_c for that pumping module 200b, while the rates 404, 406 of the remaining stages 200c, 200d are further increased in compensation. As a result, the outlet pressure 414 of the final module 200d continues to be maintained at its desired level. Similarly, at time t₃, the controller 210 begins to reduce the motor speed 404 of the third module 200c to ensure that NPSH_A at its inlet 202c does not fall below its NPSH_c, while compensating by further increasing the motor speed 406 of the fourth module 200d.

According to this approach, the desired pressure and flow at the outlet 304 of the pumping system is maintained until NPSH_A at the inlet 202d of the topmost pumping module 200d approaches its NPSH_c, at which point its operating rate 406 is reduced, and the output flow and pressure of the entire pumping system begins to fall. As a result, the desired output head and flow are maintained to a much lower liquid level 302, as compared to conventional pumps in which all of the impellers are constrained to operate at the same rate.

FIGS. 4A and 4B illustrate an example wherein before the container 300 is empty, at time t4, it becomes necessary to reduce the rotation speeds of all of the pumping modules 200a-200d. It should be noted, however, that for many applications of the present invention it is possible to provide a sufficient number of pumping modules to ensure that NPSH_A for the final pumping module never falls to NPSH_c, such that reducing the rotation speed of the final pumping module is not necessary, and the desired output flow and pressure remain constant at their desired levels, until the stripping stage is reached where the intake 202a of the first module 200a is no longer covered by liquid 302, and gas is drawn into the pumping system.

The disclosed pumping system also provides a significantly higher time efficiency as compared to conventional pumps in which all of the impellers operate at the same rate, because varying the rotation rates 400, 402, 404, 406 of the pumping stages 200a-200d enables the system to maintain a higher flow for lower liquid levels 302 within the container 300.

Figure 5A:
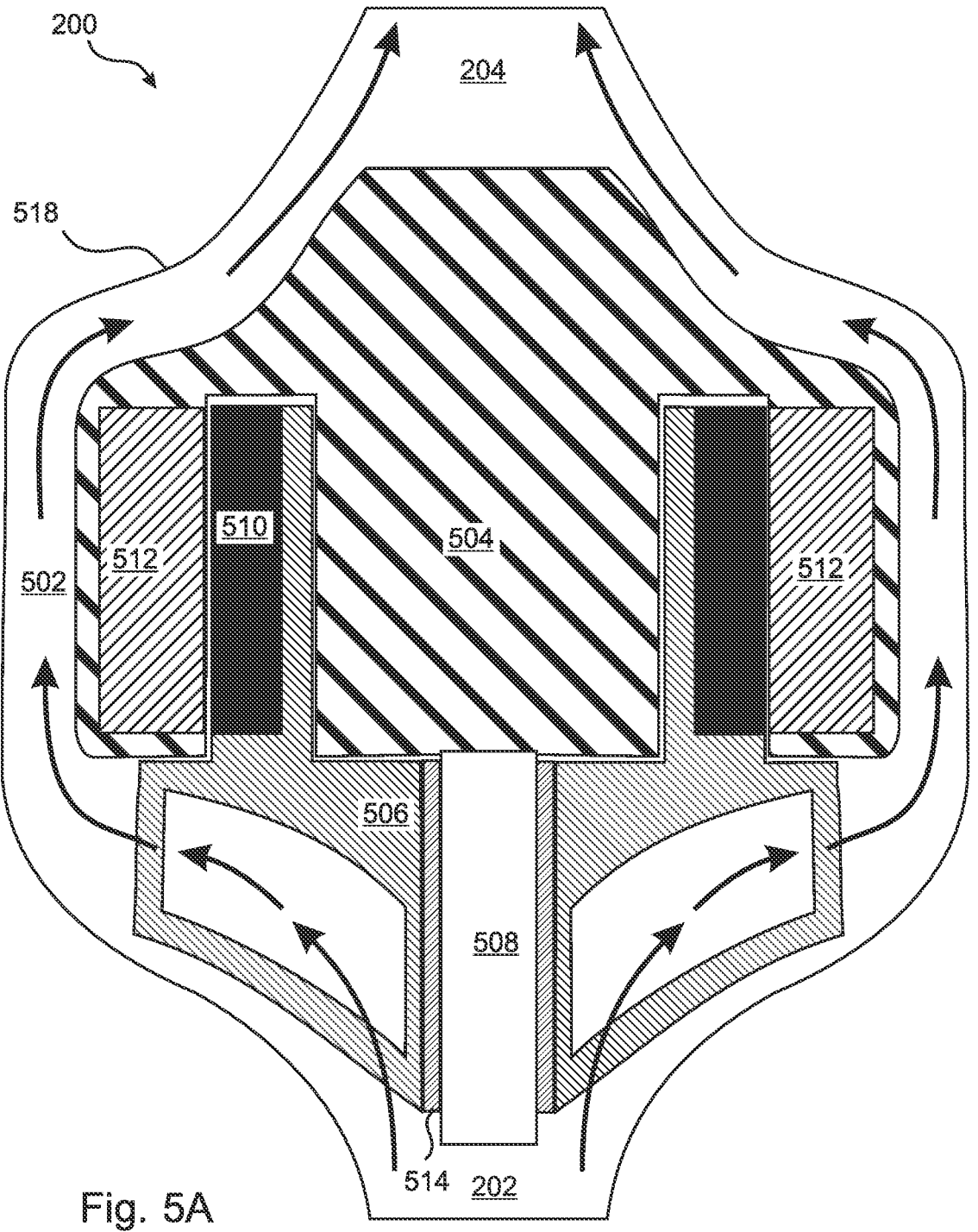
FIG. 5A is a cross-sectional illustration of an IMP module in an embodiment of the present invention in which permanent magnets are attached to the impellers, and stator coils are radially aligned with the permanent magnets.
Figure 5B:
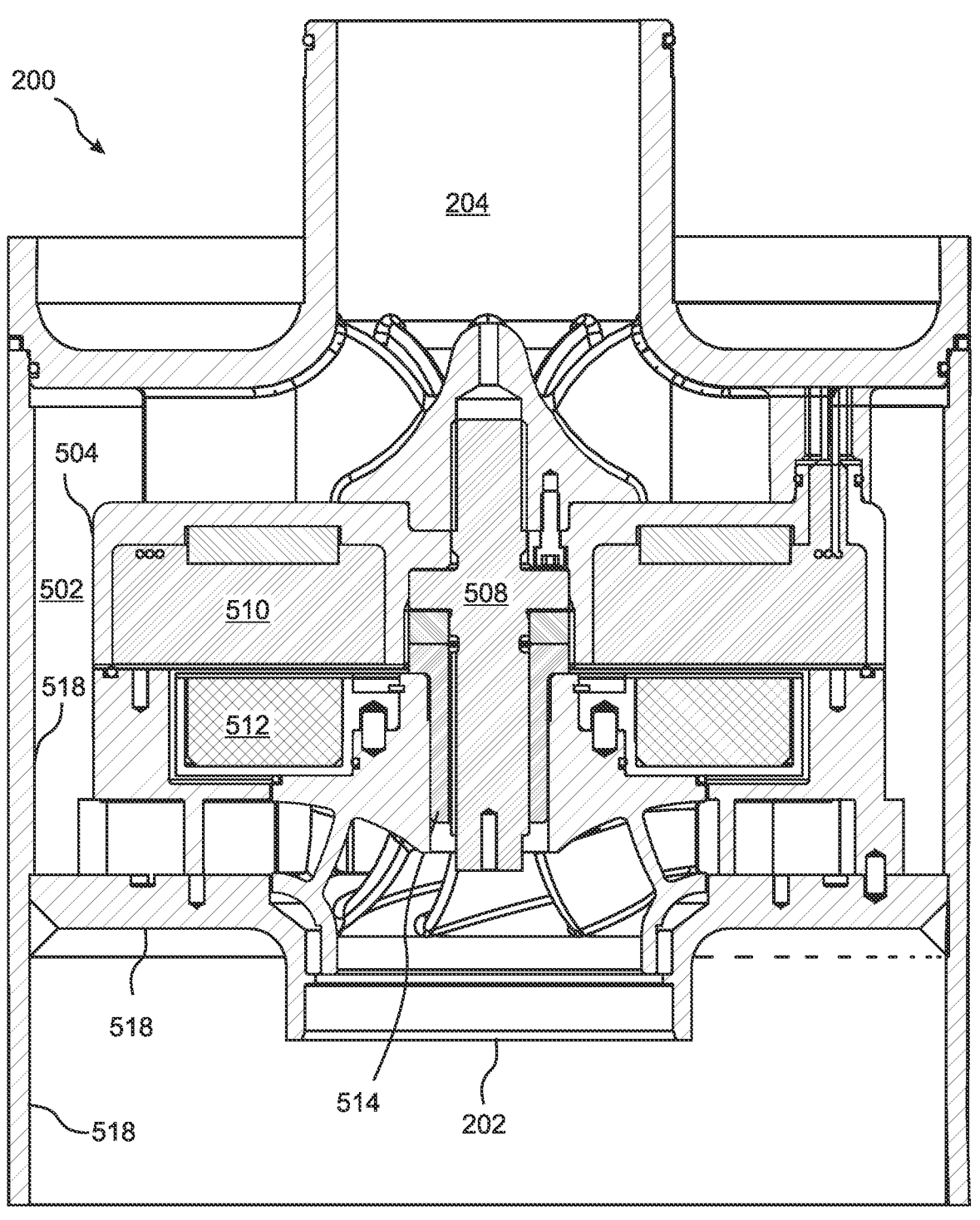
FIG. 5B is a cross-sectional illustration of an IMP module in an embodiment of the present invention in which permanent magnets are attached to the impellers, and stator coils are axially aligned with the permanent magnets.
Figure 5C:
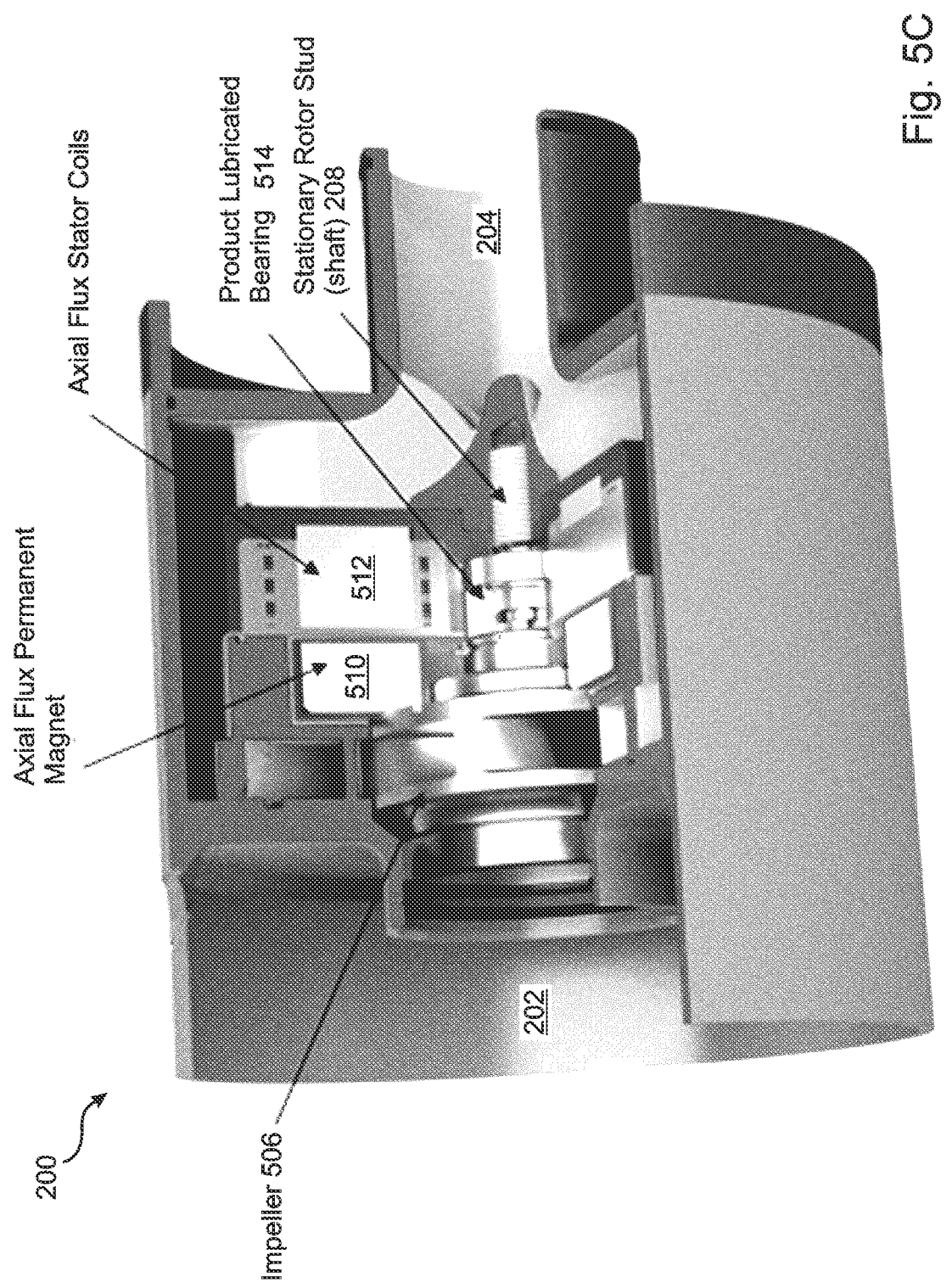
FIG. 5C is a perspective cutaway view drawn to scale of the IMP module of FIG. 5B.

With reference to FIGS. 5A-5C, in certain embodiments, each of the IMP modules 200 includes an impeller that is directly driven by attaching induction coils or permanent magnets 510 to the impeller 506, and are caused to pass close to stator coils 512 provided within a stator housing 504 as the impeller 506 is rotated. Torque is thereby transmitted directly from the stator coils 512 to the impeller 506 without the use of a rotating shaft. The induction coils or permanent magnets 510 and the stator coils 512 can be radially aligned, as in the embodiment of FIG. 5A, or axially aligned, as in the embodiments of FIGS. 5B and 5C. The stator housing 504 is surrounded by a housing 518 of the IMP module 200.

In embodiments, the process liquid that is pumped by the module 200, such as liquid H2, is distributed about an annular space 502 that is formed between the stator housing 504 and the module housing 518 as it flows from the inlet 202 to the outlet 204. In some of these embodiments, the IMP modules 200 are similar to the "sealless" motor pump modules disclosed by U.S. Pat. No. 11,323,003, also by the present applicant, which is herein incorporated by reference in its entirety for all purposes.

In the embodiments of FIGS. 5B-5C, the IMP impeller 506 rotates about a fixed, i.e. non-rotating, shaft or "stud" 508, and is supported and fixed axially and radially by a product-lubricated bearing 514. Using the working liquid as a lubricant for the bearings 514, in embodiments, eliminates the need for an external oil lubrication system and greatly simplifies the overall pump design and maintenance, especially when pumping a cryogenic liquid such as LH2. Also, pumping a low dynamic viscosity working liquid, such as LH2, minimizes friction losses of the bearings 514 and gap between the rotor and the stator.

Figure 5D:
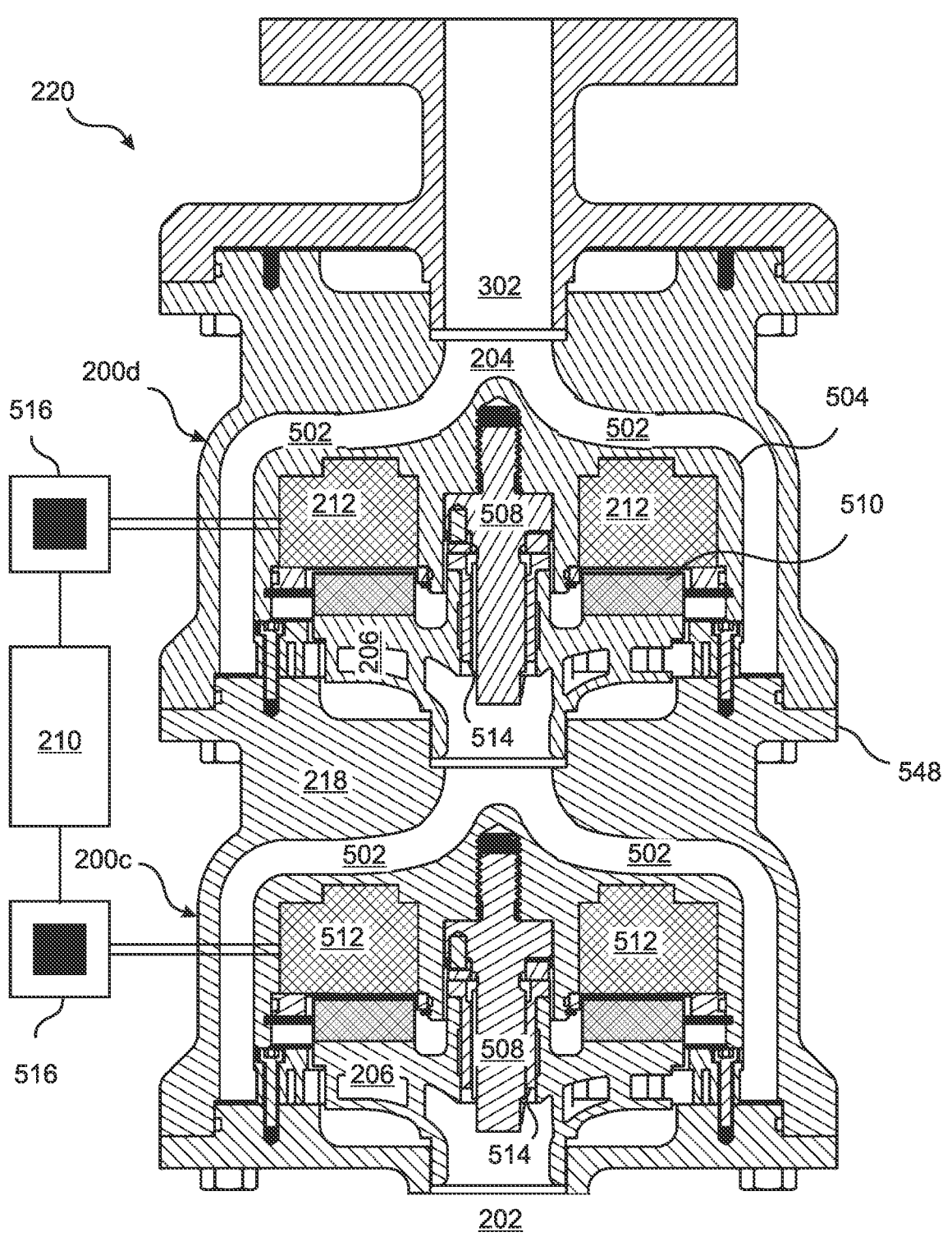
FIG. 5D is a cross-sectional illustration drawn to scale that illustrates two of the IMP modules of FIG. 5B directly interconnected and nested together.

FIG. 5D is a sectional view of two of the modules 200c, 200d of FIG. 2C connected in series. In the illustrated embodiment, the modules are configured for nested interconnection, without requiring intervening hoses or pipes. According to the present invention, with reference to FIG. 5D, a separate adjustable speed drive 516, such as a variable frequency drive, provides energy to the stator coils 512 of each of the modules 200a-200d.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A pumping system configured for pumping a process liquid to an external destination from a container until the container is substantially empty, the pumping system comprising:

a controller;

a plurality of centrifugal integrated pumping modules (IMPs) configured for being submerged in the process liquid, each of the IMPs comprising:

an inlet;

an outlet;

an impeller;

a shaft; and a motor; and for each of the IMPs, a corresponding adjustable speed drive (ASD) controlled by the controller and configured to cause the motor of the IMP to rotate the impeller of the IMP at a rotation speed that is specified by the controller, the impeller rotation speeds of each of the IMPs being thereby separately controllable by the controller;

wherein for each of the IMPs except a last of the IMPs, the outlet of the IMP is in fluid communication with the inlet of a next one of the IMPs, the inlet of a first of the IMPs being submerged in the process liquid and the output of the last of the IMPS being in fluid communication with the external destination; and wherein as a level of the process liquid within the container falls, the controller is configured to separately and continuously adjust the rotation speeds of the impellers of each of the IMPs such that for each of the IMPs, a critical net positive suction head NPSH_c of the IMP remains below an available net positive suction head NPSH_A of the IMP, while an outlet pressure at an outlet of the last IMP is maintained at a specified level until the NPSH_A of the last IMP falls to the NPSH_c of the last IMP, or until the container is empty of the process liquid.

2. The pumping system of claim 1, wherein all of the IMPs are identical to each other.

3. The pumping system of claim 2, wherein the controller is configured to cause all of the impellers of the IMPs to rotate at the same speed, except for any of the IMPs that requires a reduction of its impeller speed to ensure that its NPSH_c remains below its NPSH_A.

4. The pumping system of claim 1, wherein the first IMP is an inducer IMP having an NPSH_c that is lower than the NPSH_c's of the other IMPs as a function of impeller rotation speed.

5. The pumping system of claim 1, wherein the IMPs are arranged vertically, the first IMP being a lowest IMP and the last IMP being an uppermost IMP.

6. The pumping system of claim 1, wherein the inlet of each of the IMPs except the lowest of the IMPs is inserted into the outlet of a next lowest of the IMPs, or the outlet of each of the IMPs except the uppermost of the IMPs is inserted into the inlet of a next highest of the IMPs.

7. The pumping system of claim 1, wherein at least one of the ASDs is a variable frequency drive (VFD).

8. The pumping system of claim 1, wherein the pumping system includes a sufficient number of the IMPs to ensure that the NPSH_A of the last IMP does not fall to the NPSH_c of the last IMP before the container is empty of the process liquid.

9. The pumping system of claim 1, wherein the process liquid is liquid hydrogen (LH2).

10. The pumping system of claim 1, wherein the motor of at least one of the IMPs comprises:

a stator comprising a plurality of stator coils; and a plurality of induction coils or permanent magnets fixed to the impeller and configured to pass in proximate alignment with the stator coils when the impeller rotates, rotational torque being thereby imparted directly from the stator coils to the impeller.

11. The pumping system of claim 10, wherein for at least one of the IMPs the plurality of permanent magnets or induction coils are configured to pass in proximate radial alignment with the stator coils when the impeller rotates.

12. The pumping system of claim 10, wherein for at least one of the IMPs the plurality of induction coils or permanent magnets are configured to pass in proximate axial alignment with the stator coils when the impeller rotates.

13. The pumping system of claim 10, wherein at least one of the IMPs is configured to cause the process liquid to flow through an annual passage formed between a module housing and a housing of the stator.

14. A method of pumping a process liquid from a container until the container is substantially empty, the method comprising:

providing a pumping system comprising:

a controller;

a plurality of centrifugal integrated pumping modules (IMPs) configured for being submerged in the process liquid, each of the IMPs comprising:

an inlet;

an outlet;

an impeller;

a shaft; and a motor; and for each of the IMPs, a corresponding adjustable speed drive (ASD) controlled by the controller and configured to cause the motor of the IMP to rotate the impeller of the IMP at a rotation speed that is specified by the controller, the impeller rotation speeds of each of the IMPs being thereby separately controllable by the controller;

for each of the IMPs except a last of the IMPs, causing the outlet of the IMP to be in fluid communication with the inlet of a next one of the IMPs;

submerging the inlet of a first of the IMPs in the process liquid;

causing the output of the last of the IMPS to be in fluid communication with the external destination;

causing the impellers of the IMPs to rotate under control of the ASDs according to instructions separately issued to the ASDs by the controller, thereby causing a level of the process liquid within the container to fall as the process liquid is transferred to the external destination; and as the level of the process liquid within the container falls, separately and continuously adjusting the rotation speeds of the impellers of each of the IMPs, under control of the ASDs according to instructions issued to the ASDs by the controller, such that for each of the IMPs, a critical net positive suction head NPSH_c of the IMP remains below an available net positive suction head NPSH_A of the IMP, while an outlet pressure at an outlet of the last IMP is maintained at a specified level until the NPSH_A of the last IMP falls to the NPSH_c of the last IMP, or until the container is empty of the process liquid.

15. The method of claim 14, wherein the process liquid is liquid hydrogen (LH2).

16. The method of claim 14, wherein all of the IMPs are identical to each other.

17. The method of claim 16, wherein causing the impellers of the IMPs to rotate includes causing all of the impellers of the IMPs to rotate at the same speed, except for any of the IMPs that requires an impeller speed reduction to ensure that its NPSH_c remains below its NPSH_A.

18. The method of claim 14, wherein the motor of at least one of the IMPs comprises:

a stator comprising a plurality of stator coils; and a plurality of induction coils or permanent magnets fixed to the impeller and configured to pass in proximate alignment with the stator coils when the impeller rotates, rotational torque being thereby imparted directly from the stator coils to the impeller.

19. The method of claim 18, wherein for at least one of the IMPs the plurality of induction coils or permanent magnets are configured to pass in proximate radial alignment with the stator coils when the impeller rotates.

20. The method of claim 18, wherein for at least one of the IMPs the plurality of induction coils or permanent magnets are configured to pass in proximate axial alignment with the stator coils when the impeller rotates.

* * * * *